US010162618B2

(12) United States Patent
Fors et al.

(10) Patent No.: US 10,162,618 B2
(45) Date of Patent: Dec. 25, 2018

(54) METHOD AND APPARATUS FOR CREATION OF CUSTOMIZED INSTALL PACKAGES FOR INSTALLATION OF SOFTWARE

(75) Inventors: Tim Alan Fors, Toronto (CA); Robert Howard High, Jr., Round Rock, TX (US); Rohit V. Kapoor, Richmond Hill (CA); James Lee Van Oosten, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 3822 days.

(21) Appl. No.: 11/004,285

(22) Filed: Dec. 3, 2004

(65) Prior Publication Data

US 2006/0123414 A1   Jun. 8, 2006

(51) Int. Cl.
*G06F 9/445* (2018.01)
*G06F 8/61* (2018.01)

(52) U.S. Cl.
CPC ...................... *G06F 8/61* (2013.01)

(58) Field of Classification Search
USPC ................................. 717/175–177
See application file for complete search history.

(56) References Cited

U.S. PATENT DOCUMENTS

| | | | |
|---|---|---|---|
| 6,378,127 B1 | 4/2002 | Delo | 717/11 |
| 6,535,915 B1 * | 3/2003 | Valys et al. | 709/222 |
| 6,591,418 B2 | 7/2003 | Bryan et al. | 717/177 |
| 7,536,687 B1 * | 5/2009 | Myers | G06F 8/658 717/174 |
| 2002/0010808 A1 * | 1/2002 | Wiggins et al. | 709/328 |
| 2002/0013939 A1 * | 1/2002 | Daynes | G06F 8/61 717/170 |
| 2002/0066010 A1 * | 5/2002 | Bourke-Dunphy | G06F 8/61 713/100 |
| 2002/0112232 A1 * | 8/2002 | Ream | G06F 8/61 717/176 |
| 2003/0001854 A1 | 1/2003 | Jade et al. | 345/581 |
| 2004/0060035 A1 * | 3/2004 | Ustaris | G06F 8/61 717/100 |
| 2004/0123284 A1 * | 6/2004 | Bryant et al. | 717/174 |
| 2004/0181773 A1 * | 9/2004 | Mortensen | G06F 8/24 717/101 |
| 2006/0015867 A1 * | 1/2006 | Drittler | G06F 8/65 717/174 |
| 2009/0037897 A1 * | 2/2009 | Dull, III | G06F 8/60 717/168 |

* cited by examiner

*Primary Examiner* — Insun Kang
(74) *Attorney, Agent, or Firm* — Steven M. Greenberg, Esq.; Shutts & Bowen LLP

(57) ABSTRACT

An install factory creates install packages used to install complex applications onto multiple data processing systems in a reliable and reproducible manner. The install factory takes a variety of inputs to build a custom installation package. The custom install package may be used repeatedly for installs, using the same install package, a full install on a first data processing system, an updated install on a second data processing system, a fix or service pack on a third data processing system, and also configure an application on a fourth data processing system. Thereafter, all data processing systems have the desired level of the application installed. In addition, the install factory may create install packages that are modified in accordance with user preferences.

2 Claims, 11 Drawing Sheets

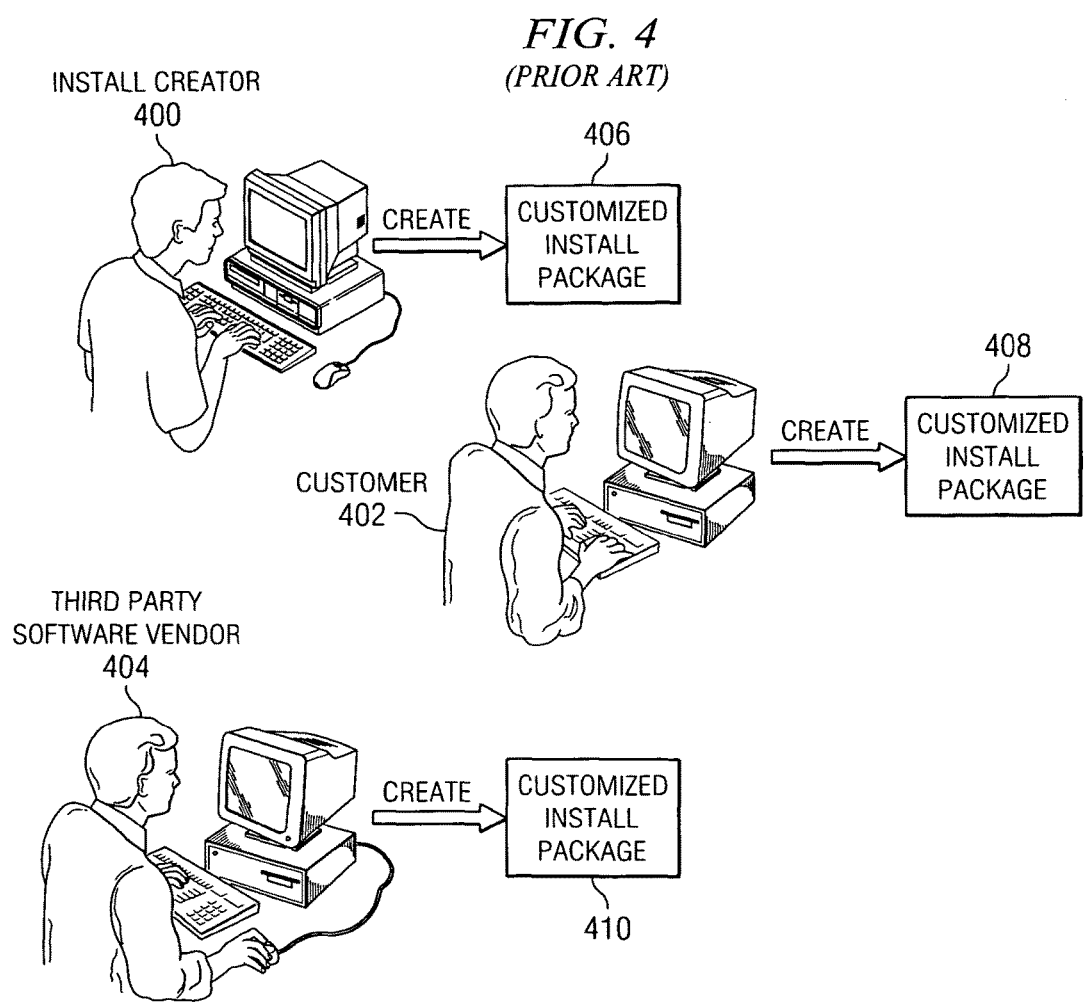

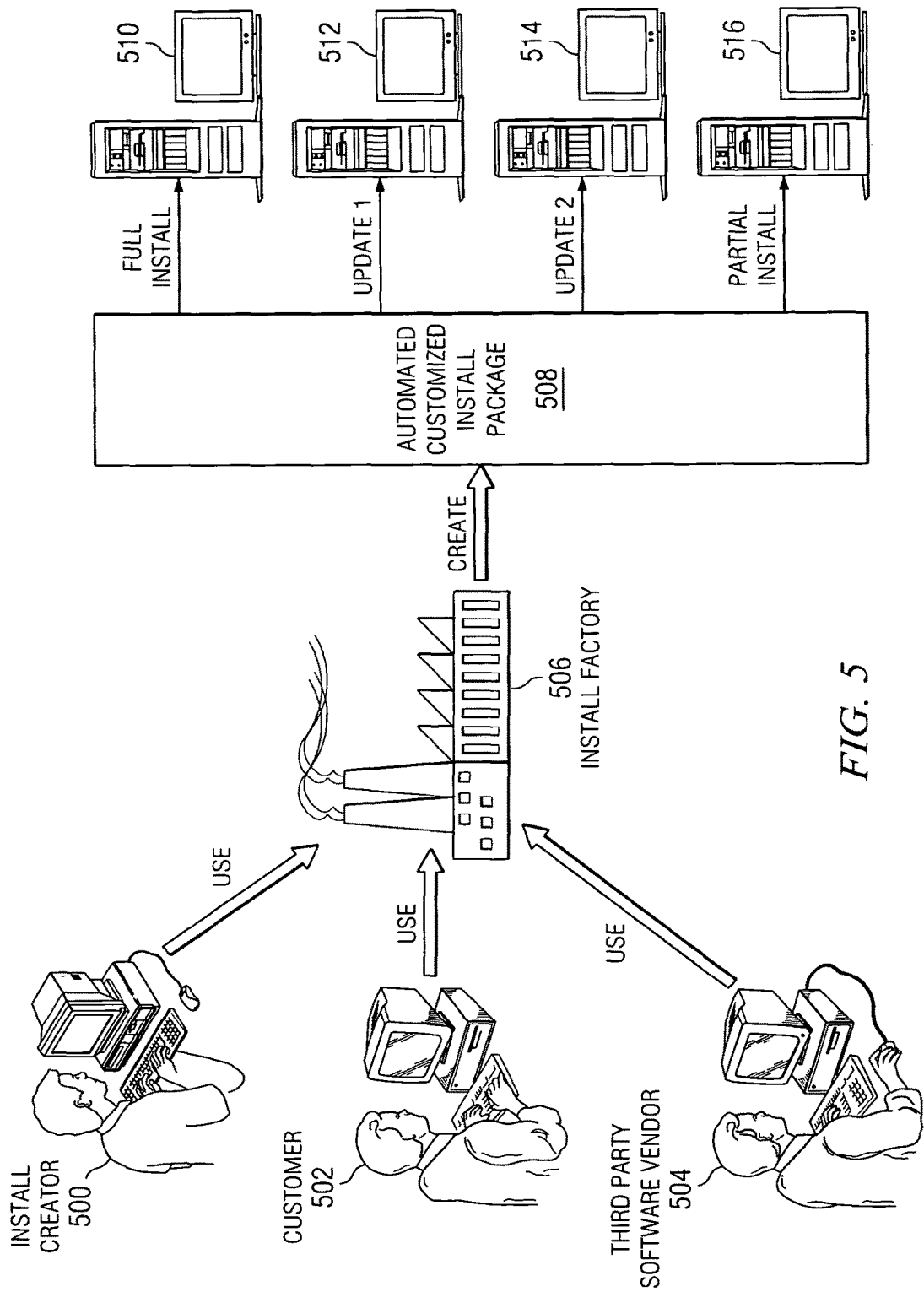

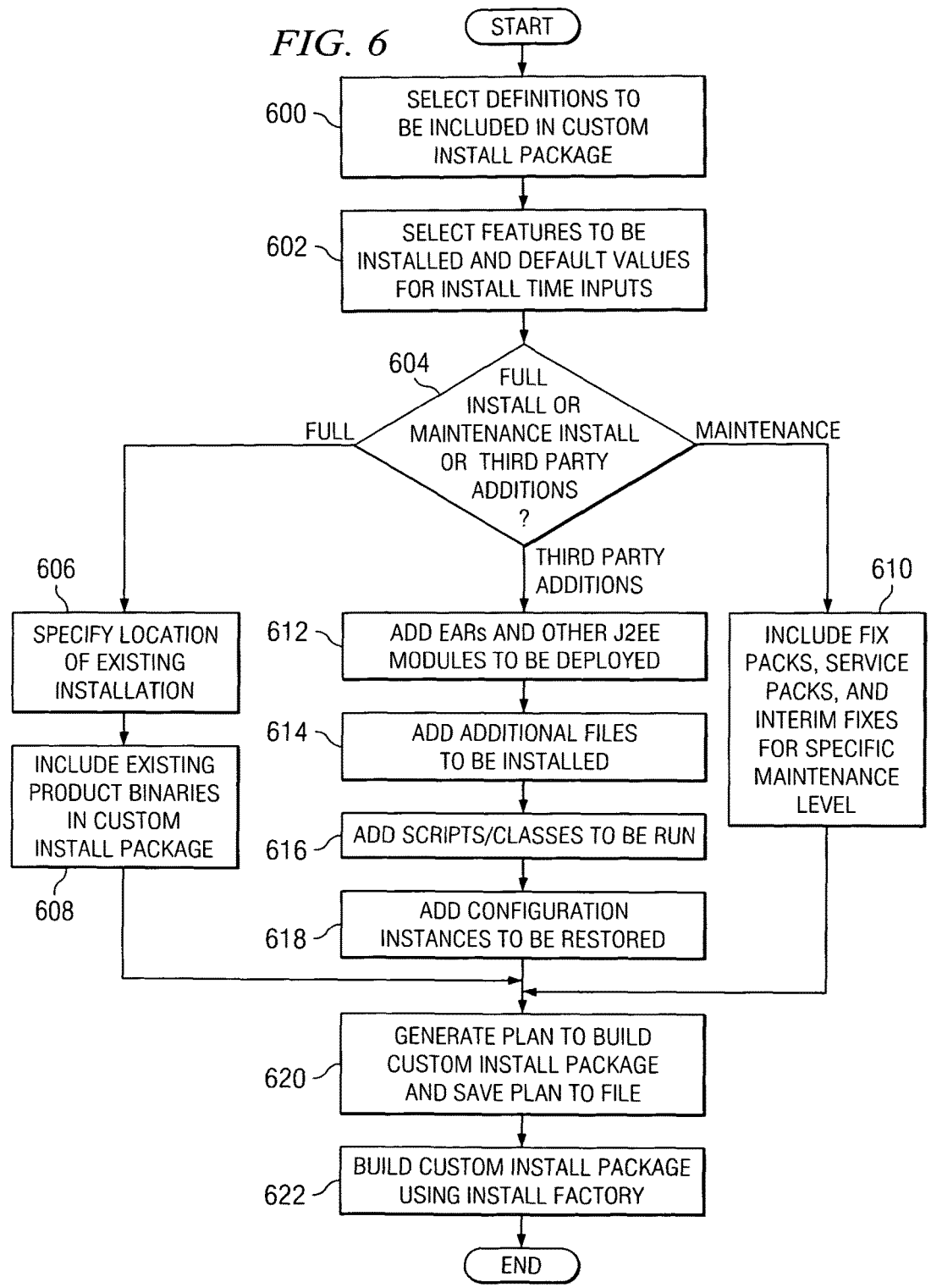

METHOD AND APPARATUS FOR CREATION OF CUSTOMIZED INSTALL PACKAGES FOR INSTALLATION OF SOFTWARE

BACKGROUND OF THE INVENTION

Technical Field

The present invention relates to data processing systems. In particular, the present invention relates to install packages to install software components in a data processing system.

Description of Related Art

In most user environments, installation and configuration of software is a multi-step process. This multi-step process includes one or more maintenance or service packages which may be in the form of a full installation of standard features, necessary fix packs, necessary service packs, one or more necessary interim fixes, configuring the installed software, and deployment of artifacts (such as J2EE applications) into the environment supported by the installed software. This multi-step process of installing and configuring software is tedious and time consuming. In addition, this multi-step process often leads to errors and makes it hard to achieve highly repeatable results. One often has to iterate over the given steps any number of times before they achieve the exact setup desired. Installation and configuring may not be a simple linear progression through each step once. Sometimes the need to iterate is just a natural and necessary part of the process, and sometimes it is because of failures that occur during any of the given steps, requiring the user to correct the problem and redo the step, or in some cases start all over again right from the beginning.

The problem multiplies, when installing software to multiple data processing systems, because the multi-step process is repeated over and over for each individual data processing system. An attempt has been made to minimize the problem by writing a script or a program that automates the installation and configuration steps. In this manner, a script may be run on individual data processing systems to perform all the necessary steps instead of manually performing each step at the individual data processing system.

Currently, different types of users create their own customized scripts to install and configure software components based on individual needs. However, the creation of customized installations is a complicated task. Some organizations don't have the skills necessary to create such things, and even if they do it is a costly and time-consuming process. In addition, having individual users creating their own installations duplicates the effort because most installations require some common software components. Furthermore, before performing or executing a customized installation using a custom install package current users have to first detect the environment and determine if the desired software components are already installed. Moreover, software vendors find it difficult to support a user environment that has different installations.

BRIEF SUMMARY OF THE INVENTION

The present invention provides a method, apparatus, and computer program product for an install factory used to create turnkey install packages that enable the installation and configuration of complex applications onto multiple data processing systems in a relatively quick, reliable and reproducible manner. The install factory takes a variety of inputs to build an automated custom installation package where service (or "maintenance") has been pre-applied to a major release of the software. The custom installation package may then be used to perform repeatable installs of the same configuration of complex software onto multiple data processing systems. Thus, the same install package may perform a full install on a data processing system not having the application, install an updated install on a second data processing system having an older version of the application, and install a fix or service pack on a third data processing system having a second older version of the application. After the install factory package has completed all installation processes, data processing systems have the same version and/or configuration of the application installed. In addition, the install factory package may perform repeatable installation of complex software on multiple data processing systems in accordance with user preferences. Thus, the install factory produces fully customizable install packages capable of replicating the installing of complex software across many different data processing systems, wherein each data processing system may have had differing versions or configurations of the complex software installed before the install package is executed.

In one embodiment of the present invention there is provided a data processing system-implemented method for creating customizable install packages, the method comprising: obtaining an at least one asset selected from a group of assets comprising an existing installation, third party additions, a functional install image and a maintenance package; generating a build definition from the at least one asset; and building the customizable install package from the generated build definition.

In another embodiment of the present invention there is provided a data processing system for creating customizable install packages, the data processing system comprising: a means for obtaining an at least one asset selected from a group of assets comprising an existing installation, third party additions, a functional install image and a maintenance package; a generator for generating a build definition from the at least one asset; and a builder for building the customizable install package from the generated build definition.

In yet another embodiment of the present invention there is provided an article of manufacture for directing a data processing system to create customizable install packages, the article of manufacture comprising: a program usable medium embodying one or more instructions executable by the data processing system, the one or more instructions comprising: data processing system executable instructions for obtaining an at least one asset selected from a group of assets comprising an existing installation, third party additions, a functional install image and a maintenance package; data processing system executable instructions for generating a build definition from the at least one asset; and data processing system executable instructions for building the customizable install package from the generated build definition.

BRIEF DESCRIPTION OF THE SEVERAL VIEWS OF THE DRAWINGS

FIG. 4 is a diagram illustrating a known technique for creating customized install packages for installation of software in accordance with an aspect of the present invention;

FIG. 5 is a diagram illustrating a new technique for creating customized install packages for installation of software, in accordance with an aspect of the present invention;

FIG. 6 is a flowchart of a process for an install creator to create a custom install package using the install factory, in accordance with an aspect of the present invention;

FIG. 7B is a flowchart of a process for applying customization, in accordance with an aspect of the present invention;

DETAILED DESCRIPTION OF THE INVENTION

Figure 1:
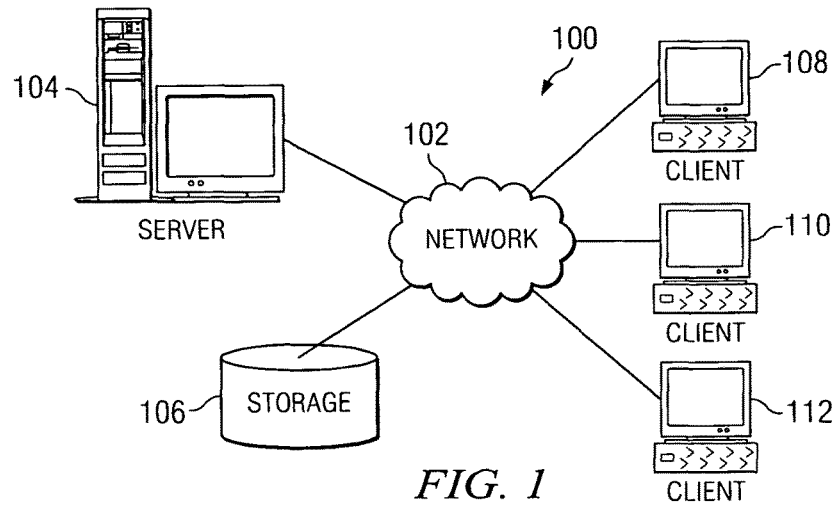
FIG. 1 depicts a pictorial representation of a network of data processing systems in which the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as JAVA 7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
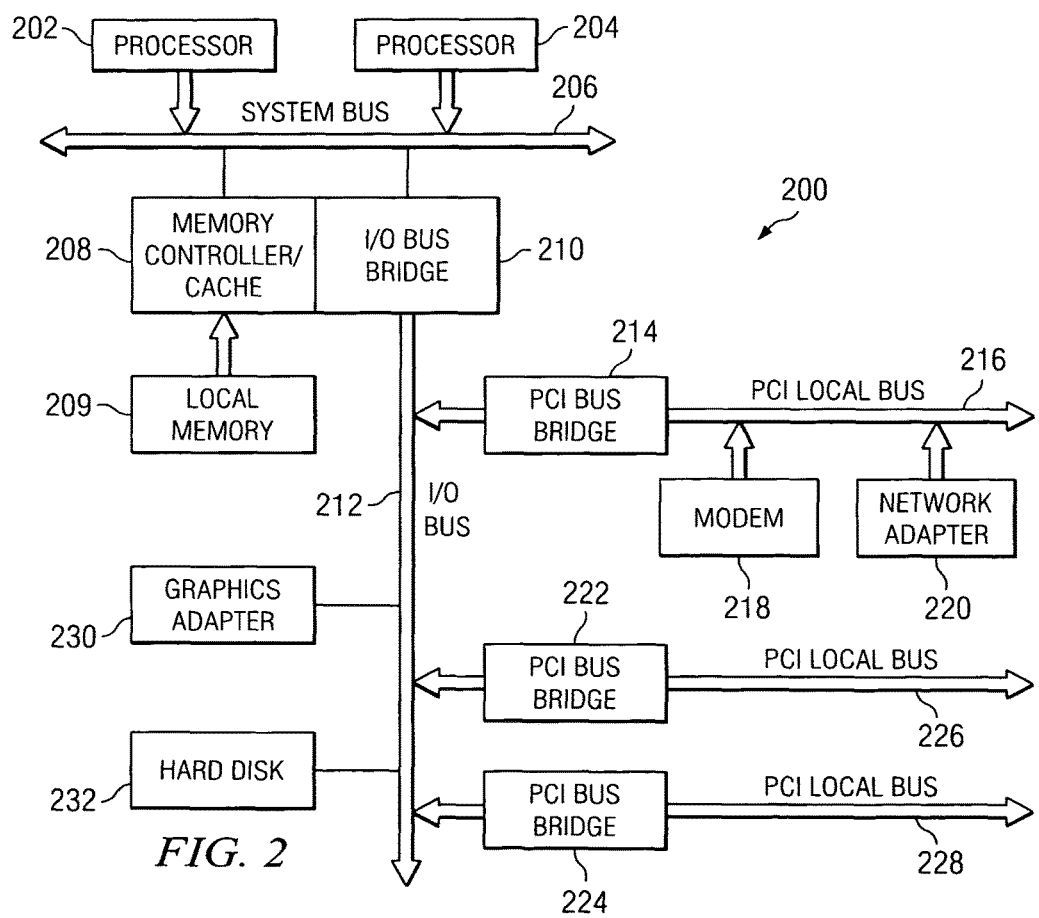
FIG. 2 depicts a block diagram of a data processing system that may be implemented as a server, such as server 104 in FIG. 1, in accordance with an aspect of the present invention.

FIG. 2 depicts a block diagram of a data processing system that may be implemented as a server, such as server 104 in FIG. 1, in accordance with an aspect of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ pSeries® computer system, running the Advanced Interactive Executive (AIX®) operating system or LINUX operating system (IBM, eServer, pSeries and AIX are trademarks of International Business Machines Corporation in the United States, other countries, or both while Linux is a trademark of Linus Torvalds in the United States, other countries, or both).

Figure 3:
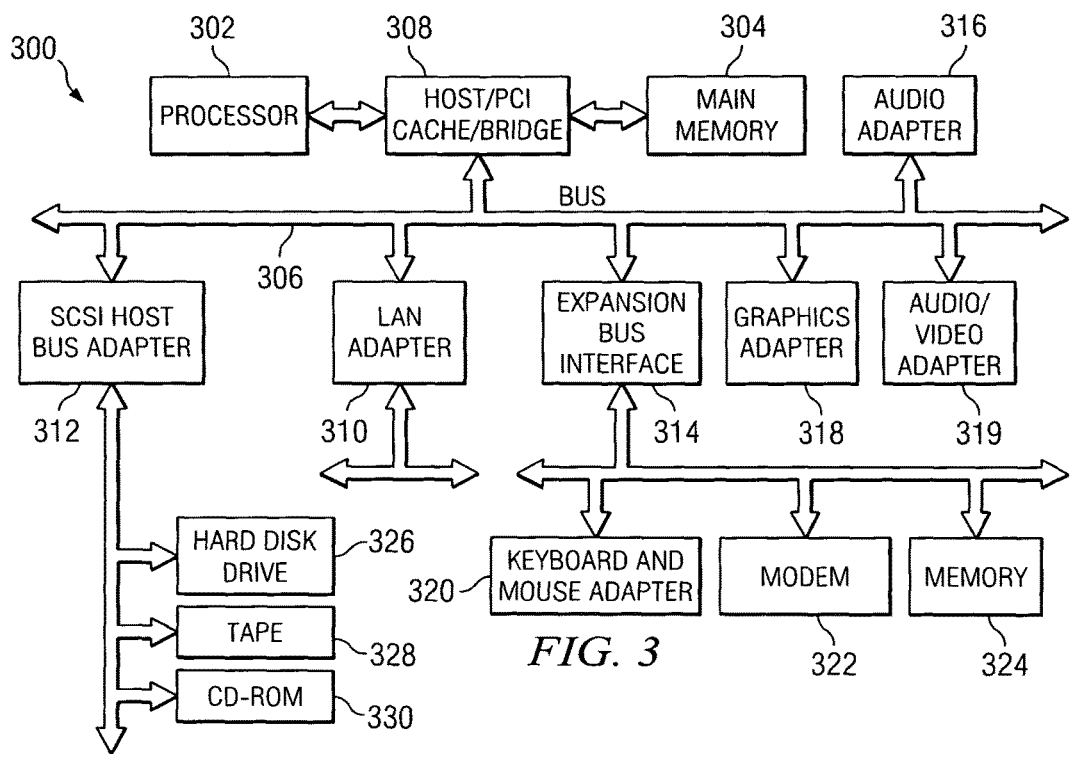
FIG. 3 is a block diagram illustrating a data processing system in which the present invention may be implemented.

FIG. 3 is a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Microsoft® Windows® XP (Microsoft and Windows are trademarks of Microsoft Corporation in the United States, other countries, or both). An object oriented programming system such as Java™ may run in conjunction with the operating system and provide calls to the operating system from Java™ programs or applications executing on data processing system 300. "Java™" is a trademark of Sun Microsystems, Inc (Java is a trademark of Sun Microsystems, Inc. in the United States, other countries, or both). Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for creation of customized install packages for installation and initial configuration of software on data processing systems, such as clients or servers. The present invention provides an install factory that creates custom install packages for installation and configuration of software components. Current installation tools may be viewed in general as install creation tools that help an install administrator create an install for a given program basically from scratch by supporting tasks such as allowing the definition of what the install wizard should look like, what files are to be installed, and what configuration steps are to be performed. And certainly, the install program created using such current tools would be a custom one as not every install created by such current tools is the same. Embodiments of the present invention in providing an install factory enables customers to "finish the job" by putting their own spin on the software installation process including a level of maintenance to be installed, initial configuration to be created, and modifying the user experience. This activity is performed within the context of customizing an existing install and configuration process, rather than creating an install program from scratch as in the case of current tools. The current tools do not typically provide users of the tools a means of addressing the whole end-to-end process of installing and configuring a product in a custom, turnkey manner to finish the job.

The custom install packages may install software components, such as application server software components, in a variety of distributed operating systems. In this way, the same custom install package may be used to install the same software components in multiple data processing systems in a network across nodes and clusters.

The custom install package performs installation steps. These steps may include installing a fixed set of predetermined features using customized default values for user input required at installation time, installing software at a predefined level of maintenance or service level, automatically configuring the software components upon installation, reducing footprint of installation if not all software components are required, installing software components from scratch, updating software components currently installed, and providing a user interface that allows users to customize installation steps. The install creator determines whether to have a fixed set of predetermined features or whether the install user (end user) will retain some (or even all) ability to perform feature selection at install time. Giving the install creator the ability to set these kinds of install-time rules/policies with great flexibility is an inherent feature of embodiments of the present invention. A reduction in footprint is with respect to the size of the install package and not the amount of disk space the product occupies once it's been installed. Typically there are two different "footprints" that matter to users of software products: the size of the package that is shipped to customers (will it even fit on one CD) and the amount of disk space consumed once it's installed. Embodiments of the present invention of install factory do not factor into the second case as that is basically taken care of by the standard ability of users to choose the features they want to install when they install a product. Uses of embodiments of the present invention typically improve the first case in a number of ways. In one way, the optional features that exist in the original install package can be omitted altogether from the custom install package when it is created, at the discretion of the install creator. In a second way, the footprint may also be reduced by not having to carryall of the individual maintenance packages inside of the custom install package because they have essentially been "merged" into a single install package.

In an illustrative embodiment, the install factory provides a single turnkey solution for installation of software by allowing the install creator to create a custom service refresh with the install user then performing an install using that refresh. In other words, a refresh is a thing, as in a custom install package, and it is not something that a user does. To perform a custom service refresh, a custom install package is created by an embodiment of the install factory wherein the custom install package is at whatever given level of maintenance is desired by the install creator. For example, in the case of a given software application, an independent software vendor (ISV) might discover through testing that in order for the vendor's J2EE application to run successfully, the software application has to be at a certain level of maintenance plus one or more interim fixes. The vendor could then use an embodiment of the install factory to create a custom software application install package that will reliably install the software application at the appropriate level of maintenance.

As used in these illustrative examples, the term "maintenance" refers to fix packs, service packs, and interim fixes that are usually associated with an install. Thus, a user may specify in the custom install image which packs and fixes are to be installed along with the software components on the user data processing system. The term "maintenance" also refers generally to any maintenance function performed during installation or update of software. It may be noted that the custom install package does not have to contain each of the individual maintenance packages. The maintenance packages are not simply bundled in with the full install image and then initiated one after the other at install time. Instead, embodiments of the install factory merge a full install image with one or more maintenance packages to produce a single install image at the given level of maintenance. By installing this single install image the product is installed at the desired level of maintenance, involving just a single step and, not several. This process typically has a significant impact on image size, install time, and install reliability compared to previous solutions in which the maintenance packages were bundled and installed in sequence under the covers.

In addition, the custom install package may be used to perform either a clean install or an update to an existing installation. A clean install typically means that the specific software components are not currently installed in a data processing system. The components may already exist but the requirement is to install yet another copy of the software, for example, a co-existing instance of the software which is independent of existing instances. Updating an existing installation is necessary to bring the existing software installation up to the same level of maintenance or service level as a clean install.

In the depicted examples, the custom install package may contain a configuration bundle. This bundle may include one or more configuration entities, such as, for example, a cell, a node, a server, and an application. These configuration entities are automatically restored into a new set of configuration files with appropriate fix-ups or "adjustments" which make these predefined configuration artifacts applicable to the environment of the new installation into which they are being restored. For example, the fix-ups make the predefined configuration artifacts "portable" or able to be relocated from one installation of the product to another. The ability to create a configuration archive from one installation of a software application and restore it into another may be a feature of the software application itself. Embodiments of the present invention, install factory, are able to leverage that inherent product capability, to restore the saved set of configuration data at install time, thereby providing a turnkey install and configuration solution.

Furthermore, custom install package may execute scripts to perform additional configuration by creating or modifying a set of configuration files. Such scripts are not limited to modifying product configuration files as they can do whatever the install creator deems necessary including performing operating system (OS) operations such as creating user profiles. Thus, the custom install package may provide a mechanism to redefine a configuration during an installation, including deployed applications through the ability to do dynamic configuration at install time using scripts, instead of or in addition to restoring a predefined set of configuration data. In most cases some combination of these approaches will be required in order to fully configure the product in a customized fashion.

Thus, embodiments of the present invention of install factory described herein provides for a method, apparatus, and computer program product for installing the same version, configuration, service level and/or level of maintenance in each of a large number of data processing systems. The install factory may be used to produce install packages for use immediately after purchase, "out of the box." In addition, the install factory may be used to produce custom install packages dependent upon user preferences, programs, configurations, and settings. An install factory install package, once created, may be deployed on many servers simultaneously. Embodiments of the present invention rely on other means as may be provided by the customer to make this happen, as the install factory by itself does not support (nor prevent) simultaneous install of the packages it produces.

FIG. 4 is a diagram illustrating a prior art technique for creating customized install packages for installation of software, in accordance with an aspect of the present invention. As shown in FIG. 4, install creator 400, customer 402, and third party software vendor 404 have to create customized install packages 406-410, respectively, to meet their needs. This currently technique creates problems because customized install packages are not easy to create and efforts are duplicated when common software components are involved. In addition, third party software vendor 404 may find it difficult supporting and troubleshooting a problem if the install packages are different on each data processing system.

FIG. 5 is a diagram illustrating a technique for creating customized install packages for installation of software, in accordance with an aspect of the present invention. As shown in FIG. 5, install creator 500, customer 502 and third party software vendor 504 may now use a single turn key solution, install factory 506, to create a single custom install package, such as custom install package 508, that meet individual needs. Custom install package 508 created by install factory 508 is suited for deployment to multiple clients, including data processing systems 510, 512, 514, and 516.

In an aspect, a single install package is developed to install complex software of the same version, configuration, and maintenance level on each of data processing systems 510, 512, 514, and 516. In addition, install factory 500 can create install packages tailored for each individual data processing system 510-516. Install factory 500 may do a full install on data processing system 510, a first update on data processing system 512, and a second different update on data processing system 514. After installation is complete, each of data processing systems 510-514 have the same version, configuration, service level and level of maintenance of the application.

As described above, install factory 500 can create packages for performing different levels of installation on different data processing systems depending on user preference, and can incorporate code created by the end user. Thus, a customized install may be performed on data processing systems 510-518, such that the same version, configuration, and maintenance level of an application is on all five data processing systems.

In the event that the same installation pattern needs to be performed on another set of data processing systems, install factory 500 can repeatedly perform the same installation. Thus, in these illustrative examples, install factory 500 is capable of repeatable and reliable installation of complex software across multiple data processing systems, even though an end user may have contributed to the installation process. Whether or not the end user contributes is decided by the install creator, the person who created the custom install package. The install creator can allow some level of interaction with the install program by the end user at install time, or they can make the install process completely fixed or non-interactive. In practical terms, this means the user experience for a custom installation of the product can be tailored or controlled to look exactly like the user experience of the original product (for example as in the case of the original product install program shipped), it could be radically different (by removing various installation wizard panels, or changing some defaults), or range between the two approaches.

In these illustrative embodiments, install factory 500 may be implemented in a server, such as data processing system 104 in FIG. 1, for use by install creator or third party software vendor. However, in an alternative embodiment, install factory 500 also may be implemented on a client, such as data processing systems 108, 110, and 112 in FIG. 1, for use by the customer.

In order to allow an install creator to create a custom install package, the mechanism of the present invention provides a graphical user interface (GUI) to guide the install creator through the steps required and the many other choices and inputs that may be required to fully define the plan, assuming the install creator wants to take full advantage of all of the features that embodiments of the present invention offer for creating the custom install package. Upon selection of features to be installed by the install creator, an embodiment of the present invention creates a plan describing how the custom install package will be built. The term "plan" may also be interchanged with a "build definition" to define the types of customizations that should be applied when the custom install package is built by the "engine" of an embodiment of the present invention.

This plan or build definition is saved in a markup language file, such as an extensible markup language (XML) file. This file may later be modified by the install creator using a text editor or an XML editor. The build definition may be modified by the same install creator that created it in the first place, or some other install creator, but the install user may not modify the build definition. Further, the install creator may modify a plan using the same GUI they used to create it, whether it is a text editor, XML editor or other tool. Embodiments of the install factory GUI supports a "modify plan" capability, and not just "create a plan". It should be noted that a plan can also be created or modified outside of the GUI. Some install creators simply prefer this method, especially advanced install creators. There may also be situations where the install creators want to automate the creation of the plan or build definition as part of an overall build process that the install creators already have (for example) and in such cases it's wise to have the plan be in a format, like XML, that lends itself well to automated creation by something other than the GUI of an embodiment of the current invention. The install creator may then execute the plan using the GUI to build the custom install package. Alternatively, a command line interface (CLI) may be used instead of the GUI to generate a custom install package from the plan. Thus, the embodiments of the present invention typically use a single plan to create a custom install package that works for all platforms.

In addition, the install factory in these illustrative examples provides several possible inputs for install creators to create a custom install package. These inputs include full/fresh install definition, maintenance install definition, and third party additions to the installation.

Full and fresh install definitions allow install creators to select specific features to be installed and specify default values for install time input as well as software components to be included in the install. Maintenance install definition includes maintenance packages, such as fix packs, service packs, and interim fixes, to be applied. Third party additions to the installation includes enterprise application archives (EARs) and other J2EE (JAVA 2 Enterprise Edition) modules to be deployed, additional files to be installed, scripts to be called at the end of install and configuration files to be restored or imported at the end of install.

When creating a custom install package, install creators may select each of the above definitions separately based on their needs. For example, an install creator may select a full install at any level of maintenance or service, for example, version 6.0.2.1 and interim fixes, or effectively a custom service refresh.

The install creator also may select any or a combination of different definitions. These definitions include, for example, a full install followed by a maintenance install, a full install followed by a maintenance install and third party addition install, a standalone maintenance install to bring an existing installation up to a new level, maintenance install followed by third party addition install to update the existing installation and deploy applications, and standalone third party addition install. In addition, the install factory can perform each of these definitions across multiple data processing systems while ensuring that ultimately each data processing system has the same version of the application once the installation is complete. These combinations allow the install creator to create a custom install package that can handle most install scenarios.

For the full/fresh install definition, the install factory allows install creators to define exactly what features are to be installed by the custom install package and what default values should be used for any install time input that may be needed, for example, a node name. The install factory provides a graphical user interface that presents a series of panels that ask an install user to choose an install type or features as well as other input that will be used during the install.

Alternatively, if the install creator had previously installed the application components and saved the previous feature selections and inputs in a response file, the response file may then be used instead of presenting the series of panels in the GUI. The response file typically provides default values for install input which may be tailored to the specific needs of the install creator's product or application. While capturing of a response file during an install is not part of an embodiment of the present invention, the file may be used to "prime" the embodiments of the present invention, the install factory GUI, with values from the response file so the install creator does not have to define all of the same information from scratch using GUI. The install creator can still choose to define information as needed The install factory also provides flexibility for install creators in selection of features. For each feature that exists in the original install being customized, the install creator may specify if the feature is to be installed by default, if the feature is to be visible to the install user or not, and if the install user can change the selection state of the feature at install time or not. The install creator can also omit features altogether from the custom install. For example, in the standard software instance install there may be a feature called "samples" which the install creator can decide to include or omit from his custom install package. Omitting it obviously implies that it is not available for installation at install time and the install program would therefore not present it as an option to the user. The install creator would do this when certain that a feature is not needed by the intended users of his custom install package. This is typically a way of reducing the size of the custom install package relative to the original install package.

In addition to selecting features, the full/fresh install definition also allows install creators to create a custom full service refresh, which is a full install at any level of maintenance or service. In creating a custom full service refresh, the install creator may specify a directory where the software components are currently installed and where maintenance has already been applied in the usual way. The product binaries that are installed in the directory will be used by the install factory to create the new install image. Only those files that are needed for the features selected will be added to a new install image in order to reduce footprint. The process just described may be viewed as "reverse-engineering" of the installed files back into a new custom install package, including whatever the current level of maintenance the product has, defining what will be captured in the new custom install package and therefore installed when that install package is executed. In another embodiment of the present invention, an alternate approach may be found to create a custom refresh other than the one described above. In this other approach rather than using an existing installation as the source of the product files for the new custom install package, the install creator would provide the embodiment of the invention of the install factory with the original install packages typically comprising the full install image (for example, the software application instance install that was shipped on the distribution disk) plus one or more maintenance packages. The embodiment of the invention of the install factory then merges these separate packages into one package where duplication of product files has been eliminated thereby keeping the footprint to a minimum. For example if file A, was shipped as part of the original product install image, then updated in refresh pack 1, and again in fix pack 2. When an embodiment of the current invention of the install factory merges the packages together to create a custom refresh, it discards the version of file A found in the original full product install image and the one found in refresh pack 1, and retains only the copy of file A from fix pack 2. There may be other considerations during the merge, but that is the main idea. Using this approach, the install creator does not have to perform an installation of the product and an installation of maintenance prior to using the embodiment of the present invention of the install factory. An embodiment of the present invention of the install factory would effectively "apply the maintenance" to the original full install image on the fly as the merge is performed.

In addition, any existing application parameters, including the version, maintenance level, configuration, user defined configurations, or the like may be provided to the install embodiment of the present invention of the install factory. The embodiment then merges the application parameters into a single install image. Thus, the embodiment may create an install package automatically, with the install package containing all previously defined install parameters. For example, an embodiment of the present invention of the install factory may merge a full install image with a maintenance install image to create an updated full install image. This process may be done automatically so that a user of the embodiment need only deploy the resulting install package, as opposed to manually executing a full install and then applying the maintenance packages. This describes an "alternate approach" to creating a custom refresh described earlier.

Thus, the custom full service refresh, in these depicted examples, allows an install creator to use whatever level of maintenance or service currently installed in the new custom install image, such that the need to include manual maintenance during installation is eliminated. In this way, the custom install package is smaller and faster. It is also a more reliable way to install software components at a given level of maintenance or service.

Also mentioned above, the custom install package provides install creators the flexibility to perform a full install or an update to an existing installation. For an update to an existing install, the install creator may select maintenance install definition to be included in a custom install package. In other words, the install creator may select zero or one fix packs, zero or one service packs, and zero or more service packs to be included in the custom install package in order to bring the existing installation up to the desired level.

The full/fresh install and the bundled maintenance install definitions are not mutually exclusive. Thus, both a full install and a maintenance install may be packaged into a single custom install for use on multiple computers to provide the same or different version of an application. The install factory may also perform these functions on a single data processing system. This optimizes the full install, because not only is a full refresh performed for a given level of maintenance or service, existing installations may also be updated by the bundle maintenance install. Actually, if an install creator has created a custom refresh, which is a full install image at a given level of maintenance, it alone can be used for performing both new scratch installs and an update install for bringing an existing installation up to that same level of maintenance. In such cases there may be no incentive for the install creator to also include or bundle the individual maintenance packages in the custom install package as well. However, a maintenance-only type of custom install package which contains only the maintenance packages and can only be used for updating existing installations may be supported. An advantage of such an install package may be that it may have a smaller footprint than a custom refresh (depending on the cumulative size of the individual maintenance packages.

As to third party additions definition, the install creator may add enterprise application archives (EAR), other J2EE modules to be deployed, additional files to be installed, scripts and classes to be run, and configuration files to be restored. Configuration files are created by the install creator when software components are previously installed. The configuration files contain deployed applications and will be restored to the data processing system once a custom install is complete.

Once the custom install package is created by the install creator using the above features, the mechanism of present invention allows the install user to execute the custom install package in two ways, a silent install or an interactive install. A silent install is specified by the install user using a command line option at the time of installation. Although current install creation programs may be run either silently or interactively, embodiments of the present invention preserve these capabilities in the custom install packages produced thereby ensuring that nothing precludes the capability of either silent and interactive install using a given install package.

When the interactive installation is invoked, the custom install package detects if the desired features are already installed on the user's data processing system. If these features are already installed, the custom install package determines the version of the existing installation. The custom install package then prompts the install user for two options. The first option asks the install user if a new copy of the desired features should be installed in a different location from the existing installation. Although not unique to embodiments of the present invention generated packages, these embodiments do not do anything to preclude this from working for a custom install package just as it does for "standard" install packages. This first option is available if the custom install package includes the full install definition.

The second option asks the install user if the existing installation should be updated. This update may include, for example, installing additional features, applying maintenance to existing installation, and installing, restoring, or executing third party additions. Installing additional features is only available, in these illustrative examples, if the custom install package includes the full install definition and contains one or more features that are not already installed. Embodiments of the present invention enable other kinds of "augmentation" to be performed on an existing installation as mentioned above, along with an ability to install additional features (if applicable) from a single install package as an inherent property of the custom packages generated by the embodiments. Applying maintenance to existing installation is only applicable if the custom install package includes one or more maintenance packages and the existing installation is at the right level of maintenance or service. As just described, there are two possible kinds of custom install packages created by embodiments of the present invention involving maintenance: A "custom refresh" which may be a full-install package where maintenance has been "pre-applied", and a "maintenance-only" package which may be literally just a bundling of the individual maintenance packages where the packages are installed one after the other at install time. Both kinds may be used to apply maintenance to an existing installation. Thus, at least one of the maintenance packages may be applied.

In addition to detecting if the desired features are already installed, interactive install also allows the install user to select which features to install. This functionality is only applicable if the custom install package includes the full install definition, if there are additional features to be installed, and if there are optional features visible to the install user in the custom install package.

Furthermore, depending on the feature selected, the interactive install may display panels that prompt the install user to input additional choices. These panels are pre-filled with values entered by the install creator or with original default values if the install creator did not specify the new defaults. If the install user is satisfied with the pre-filled defaults, the install user may accept the defaults and proceed to the next panel. Depending on how the install creator set up the custom install, the install user may or may not be able to enter values or selections as in the case of overriding of default values. The install user may or may not also see all of the panels that were in the original install wizard because the install creator may have decided to eliminate one or more panels altogether.

With regard to applying maintenance, the interactive install automatically applies included fix packs, service packs, or interim fixes if the custom install package includes a full install definition. When the custom install package includes a maintenance install definition, the interactive install only applies maintenance packages that have not already been installed. In both a custom refresh as well as a maintenance-only package (i.e. a maintenance package bundle) the custom package will not apply maintenance unless it determines that the maintenance is required because the level of maintenance currently installed is not what's in the custom install package. The install user typically has no choice to modify how to apply maintenance, because this step is specified by the install creator when the custom install package is built. Embodiments of the present invention provide the install creator with the ability to specify this whether or not the installation of maintenance should be done automatically with no choice by the end user, or whether the user should be able to choose at install time. Typically the install creator wants to control the application of maintenance and the end user does not.

If the custom install package includes the third party additions definition, the additions will be processed in the order of laying down additional files, restoring configuration files, deploying enterprise application archives (EARs), and executing scripts at the end of install. The additions are processed after maintenance has been applied. In other illustrative embodiments, the order in which the additions will be processed may be varied.

FIG. 6 is a flowchart of a process for an install creator to create a custom install package using the install factory, in accordance with an aspect of the present invention. In these illustrative examples, the install factory may be install factory 506 of FIG. 5 and the install package may be install package 508 of FIG. 5.

As depicted in FIG. 6, the interactive form of the process begins when user input selecting definitions to be included in the custom install package is received (step 600). This user input is received from an install creator in this example. As mentioned above, a combination of full/fresh install definition, maintenance install definition, and third party additions to the install definition may be selected. A determination is then made as to whether the definition selected is a full install, maintenance install, or a third party addition (step 604) or some combination thereof.

If a full install definition is selected, a custom service refresh is created either by the user (or by a program, automated in which case there is no more user interaction to provide input), specifying the location of existing installation (step 606). Next, the process receives user input (not pictured) selecting the features to be installed by the custom install package and default values to be used for install time input (step 602). In addition to features to be installed and default values to be used there are other aspects of a full install that can be customized as mentioned above such as some (or all) of the install time input can be made "immutable" (display-only), and some of the install wizard panels omitted altogether. With regard to the features themselves it is not just a matter of selecting them, as mentioned earlier there are a variety of values the install creator can specify for any given optional feature within the original install package being customized. In this illustrative embodiment, the install creator creates the custom service refresh. Then, the mechanism of the present invention includes the existing product binaries that are installed in the location specified in step 606 in the custom install package (step 608). The process then continues to step 620. An embodiment of the present invention may also support a different approach for creating a custom refresh that is just an alternate approach to the approach discussed here. The "reverse-engineering" differs from that of the diagram in that the process would follow an alternate flow from the plan backwards.

Turning back to step 604, if the definition selected is a maintenance definition, the mechanism of the present invention includes fix packs, service packs, and or interim fixes for the maintenance level desired in the custom install package to bring an existing installation up to desired maintenance level (step 610). The process then continues to step 620.

Turning back to step 604, if the definition selected is third party additions, the mechanism of the present invention adds the EAR (enterprise application archive) and other J2EE (JAVA 2 enterprise edition) modules to be deployed to the custom install package (step 612). The files and modules will be deployed at install time. Next, additional files to be installed are added to the custom install package (step 614). These files will be installed into the product directory when the custom install is executed. Then, scripts and classes to be run are added to the custom install package (step 616). These scripts are executed every time a new set of configuration files is created (for example a "profile" or configuration instance), not just during initial install. Finally, the configuration files to be restored are added (step 618) before the process continues to step 620.

The configuration files were created when software components were previously installed. Such files would typically have been manipulated by the install creator using the existing installation's administration capability (or other means) to configure the product as required. The configuration files are exported from the existing installation and added to the custom install package. The configuration files will be restored on the user's data processing system when the custom install is executed thereby reproducing the desired configuration. The third party additions of steps 612 to 618, in these illustrative examples, have been created by the install creator to be un-modifiable by the end user at install time. These assets are then executed under the constraints as defined by the install creator. Embodiments of the present invention enable the install creator to provide the end user more selective control over the process at install time if desired, for example, by way of prompts to the user to request if the user requires selected scripts to be executed or not executed.

Subsequently, the mechanism of the present invention generates a plan to build the custom install package and saves the plan to a file (step 620). In an embodiment, the file is an extensible markup language (XML) file, though other languages may be used, such as that a JAVA properties file is a better one. Next, during step 622 the "engine" or builder portion of the embodiment of the present invention optionally builds the custom install package in conjunction with the plan or build definition provided in step 620 and the process terminates thereafter. The user may have elected to save the plan just created, and then use it later to create the package, either via the GUI or via the command line interface.

Figure 7A:
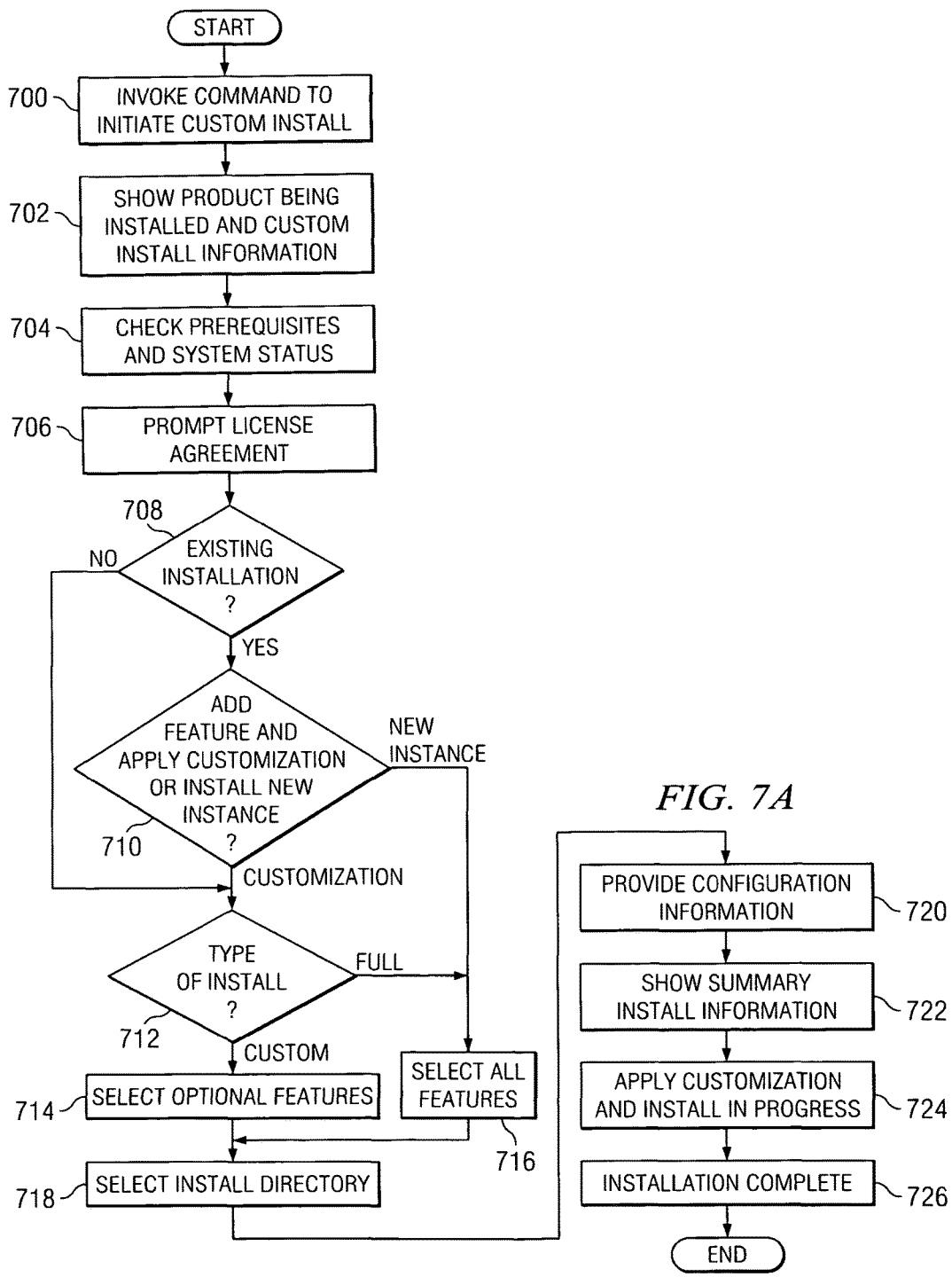
FIG. 7A is a flowchart of a process for running custom install package interactively to create a new installation, in accordance with an aspect of the present invention.

FIG. 7A is a flowchart of a process for running custom install package interactively to create a new installation, in accordance with an aspect of the present invention. This process describes the events that occur when the install user runs a custom install package interactively for the purpose of creating a new or full installation.

The process begins when a command is invoked to initiate a customized install using a custom install package, to perform an interactive install (step 700). Next, the custom install package displays to the install user a "welcome" or "confirmation" panel containing information regarding the product being installed and other installation information (step 702). This information ensures that the user is aware that a custom install package is used. For example, the information may include which organization created the custom install package and when the custom install package was built. The custom install package may prompt for input and receive user input, including a prompt for additional information or a prompt for a decision to continue the interactive install.

The custom install package then checks the prerequisites for the install process and the status of the install on the user's data processing system (step 704). Next, in this example, the install package prompts the user to a accept license agreement (step 706). The install package receives this input in this example before proceeding with the install.

Next, the custom install package determines if an existing installation is present in the user's data processing system (step 708). If no existing installation is present, the process continues to step 712. Otherwise, the custom install package may prompt the user for additional features, additional customization, third party additions or a new independent copy or instance of the software components (step 710) should be installed. If a new independent copy or instance of the software is requested, the process continues to select all available features of the full install to be installed (step 716), including any additional features and additional customization.

If customization is requested, the custom install package prompts for the type of install (step 712) and is adapted to receive user input for the type of install (as allowed by the install creator). If a custom installation is selected for which the user has more control over the installation process, the custom install package prompts the user to select optional features to be installed, receives the input (step 714) and continues to step 718. On the other hand, if a full install is selected, the custom install package selects all available features for the install (step 716) and continues to step 718.

The custom install package then prompts that a directory for installation be specified and may receive user input to specify the directory for installation (step 718). The custom install package then prompts for configuration information (step 720) and may receive user input for configuration information. This step is discussed in further detail in FIG. 7B. Once the configuration information is defined, the custom install package displays to the user a summary of the installation information (step 722). This information includes custom aspects of the custom install package, such as, for example, the level of maintenance or service level, importation of predefined configuration information.

Then, the custom install package installs software components and applies customizations (step 724). This step is discussed in further detail in FIG. 7B. Finally, the custom install package informs the user when the installation is complete (step 726) and thereafter the process terminates. The user experience when running a custom install package interactively (as described above) is largely based on the user experience of the standard install that has been customized. How it differs depends entirely on the customizations that have been made, for example, the default input values the user sees may be different, the ability to modify those values at install time may be different, some panels may have been omitted, and additional information may be displayed to the user including, as indicated above, information regarding level of service or maintenance installed, and customized configuration. The custom install is heavily based on the standard install. Using this base promotes reuse of the standard install code and install user familiarity.

Figure 7B:
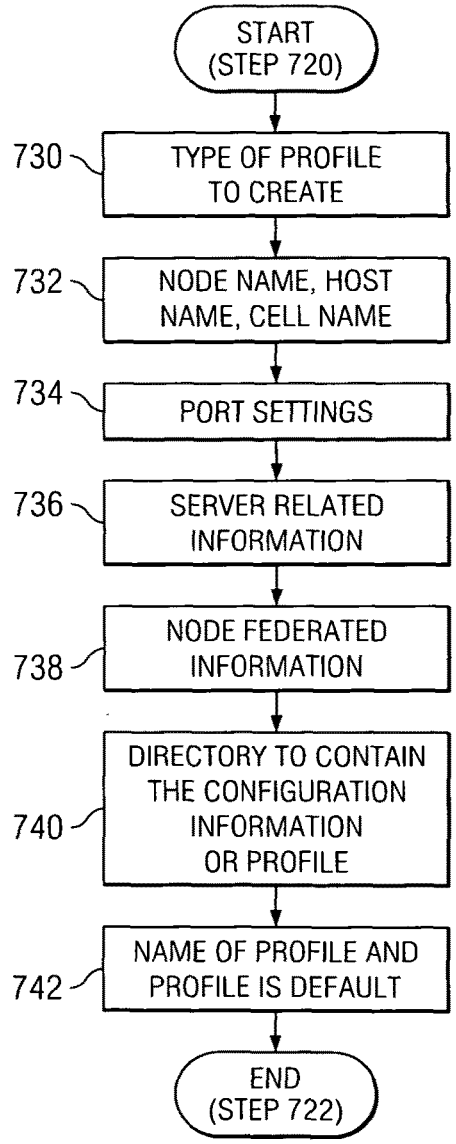
FIG. 7B is a flowchart of a process for asking user to provide configuration information, in accordance with an aspect of the present invention.

FIG. 7B is a flowchart of a process for asking a user to provide configuration information, in accordance with an aspect of the present invention. This process is a more detailed description of step 720 in FIG. 7A. As shown in FIG. 7B, the custom install package prompts for the type of profile to create (step 730) and the user may provide input to specify the type of profile to create. Examples of profile types include an application server, a deployment manager, and a managed node.

Next, the install package prompts for information regarding the node name, host name, and a cell name to which the software components are to be installed (step 732). The user may input this information. Then, the port settings are obtained (step 734) and the server related information is also obtained (step 736). The server related information includes start install manually or start install automatically.

The install package then prompts for node federation information (step 738), which the user may provide. For example, the node federation information may be the host and port of the deployment manager. The install package then prompts for the directory in which the configuration information or the profile will be contained (step 740). The user may provide this input. The install package then gives the profile a name that may have come from a user prompt, and specifies whether or not the profile is a default profile (step 742). The name may have been a default name provided by the install creator or may have been a previous name requiring an override. The naming may also have been completely hidden by the choice of the install creator who may have chosen a name, allowed a change or deiced to hide the operation altogether. The process then continues to step 722 of FIG. 7A.

Figure 7C:
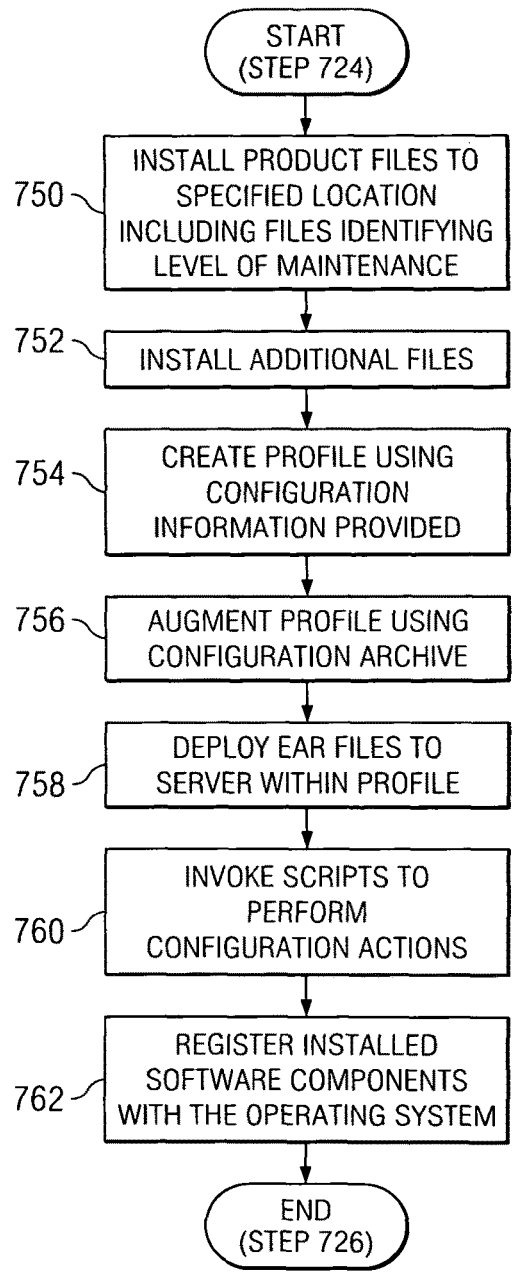

FIG. 7C is a flowchart of a process for applying customization, in accordance with an aspect of the present invention. This process discusses step 724 in FIG. 7A in further detail. As shown in FIG. 7C, the process begins when the custom install package installs product files to the location specified (step 750) in step 718 in FIG. 7A.

Next, additional files are also installed (step 752). Then, a profile is created (step 754) using information that was gathered in steps 730-742 of FIG. 7B. The profile is augmented using a configuration archive (step 756). The configuration archive provides configuration information, such as additional server definitions and applications that have been deployed.

Once the profile is augmented, the custom install package may deploy EAR files to a server designated within the profile (step 758) and then invokes scripts to perform further configuration actions (step 760). Finally, the custom install package registers the installed software components with the operating system (step 762). The process then continues to step 726 of FIG. 7A.

Some of the steps provided in FIG. 7A through 7C may be omitted for some processes, such as when a custom install is used to install software components at a given level of maintenance or service level. For example, step 702 in FIG. 7A should not be omitted if the product that is being installed is specified; the install user should see the "welcome" or "confirmation" panel. The install package need not display information to a user each time the product is installed. Step 710 in FIG. 7A may also be omitted if the custom install package specifies that the software components are already installed from scratch. Thus, a new instance is created each time the software components are installed. Alternatively, this step may be omitted if the maintenance definition is instructed to only update the existing installation with a desired level of maintenance or service level.

Step 712 in FIG. 7A may be omitted so that the custom install may be limited to a particular type. Step 714 in FIG. 7A may be omitted if the feature to be installed is predetermined by the install creator. Step 718 in FIG. 7A may be omitted if the install location is predetermined and is not modifiable. Step 720 in FIG. 7A and any of steps 730-742 in FIG. 7B may be omitted if defaults are specified by the install creator. Step 722 in FIG. 7A may be omitted if installation information is not necessary.

In addition to omitting certain steps in FIGS. 7A through 7C, some of the steps may be modified during install time. For example, step 700 in FIG. 7A may be modified by the user to pass-in options. Step 710 in FIG. 7A may be modified to set defaults to either apply customization or install a new instance of the software. In addition, defaults may be set to always create a new instance or to always apply customization.

Step 712 in FIG. 7A may be modified to set defaults for any of the available install types. Step 714 in FIG. 7A may be modified to set a default state for each optional feature to be selected or not selected. Step 718 in FIG. 7A may be modified to set a default install location different than one previously defined by the install creator. Steps 730-742 in FIG. 7B may all be modified to set default configuration information.

Figure 8:
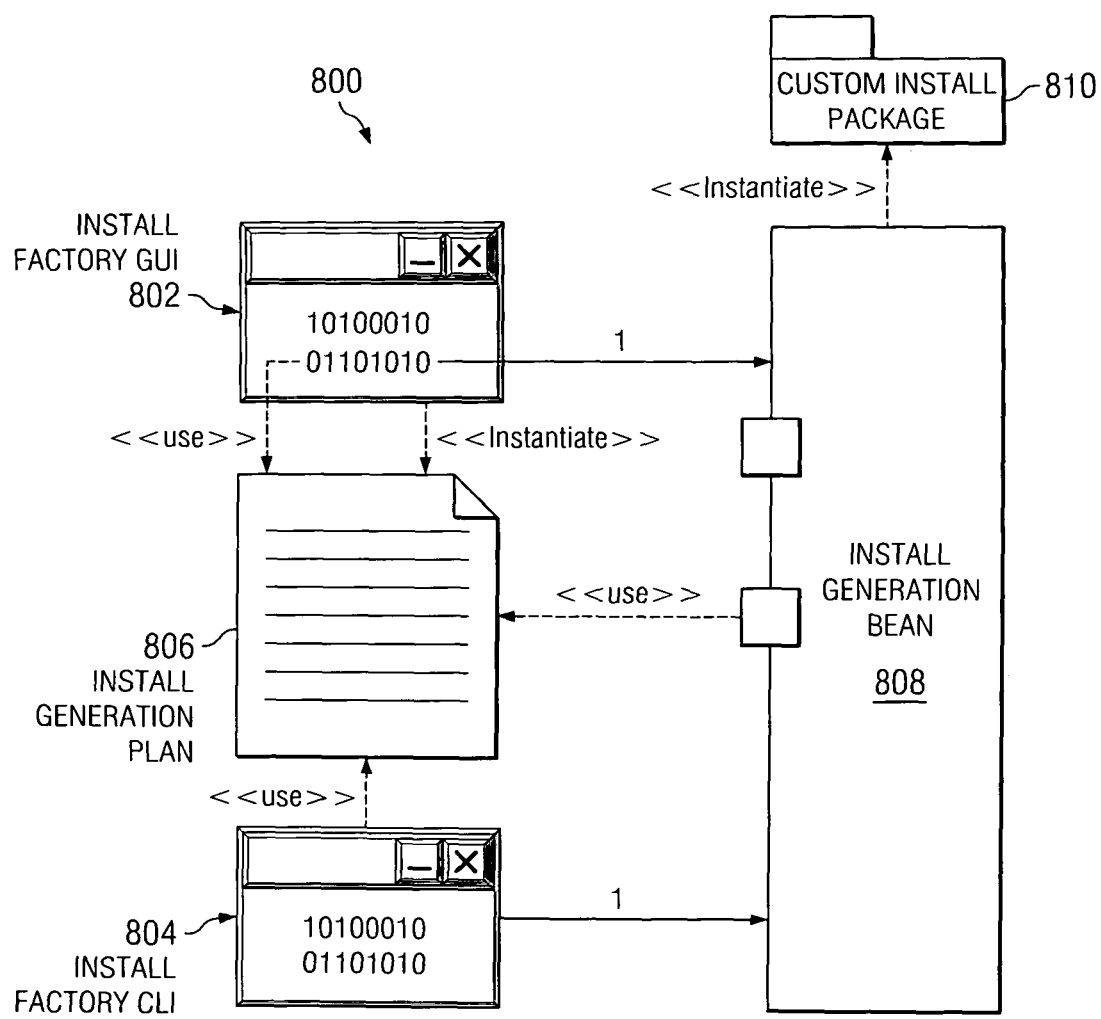
FIG. 8 is a diagram illustrating components of install factory in accordance with an aspect of the present invention.

FIG. 8 is a diagram illustrating components of an embodiment of the present invention of the install factory. As shown in FIG. 8, in this example implementation, install factory 800 includes install factory graphical user interface (GUI) 802, install factory command line interface (CLI) 804, generated install plan 806, and install generation bean 808.

Install factory GUI 802 provides information to generate install plan 806 and uses the plan to generate custom install package 810 using install generation bean 808. Install generation bean 808 generates a custom install package 810 based on the inputs specified by the install creator in install plan 806. In turn, install factory CLI 804 passes generated install plan 806 to install generation bean 808 to create custom install package 810.

Figure 9:
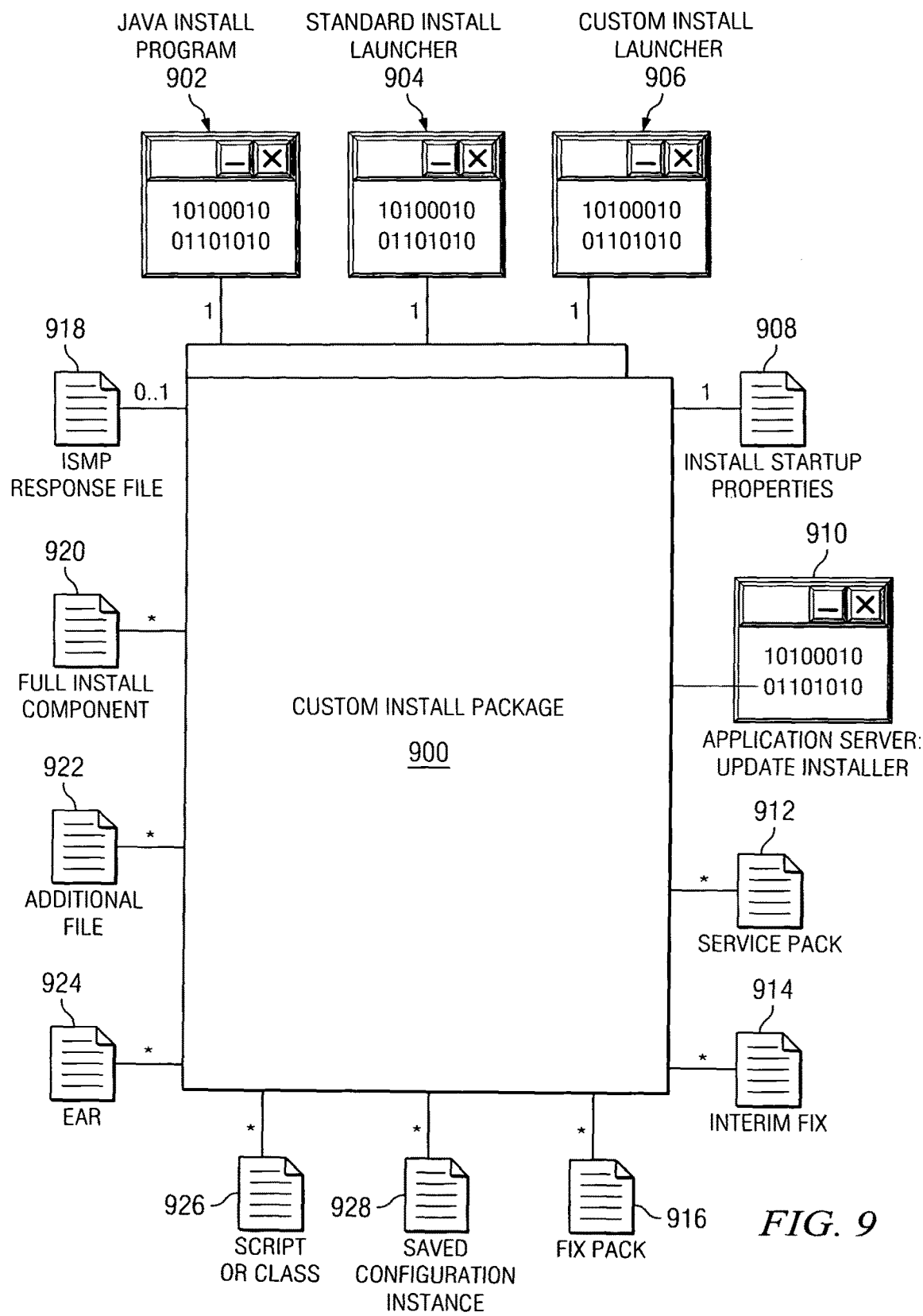
FIG. 9 is a diagram illustrating components that make up a custom install package in accordance with an aspect of the present invention.

FIG. 9 is a diagram illustrating components that make up a custom install package in accordance with an embodiment of the present invention. As shown in FIG. 9, custom install package 900 may be composed of a number of components. In the context of a custom install package for an application server software, custom install package 900 may include JAVA install program 902, standard install launcher 904, custom install package 906, install startup properties file 908, application server update installer 910, a number of service packs 912, a number of interim fixes 914, a number of fix packs 916, zero or more ISMP response files 918, and a number of full install components 920.

In addition, custom install package 900 may include a number of additional files 922, a number of enterprise application archives (EARs) 924, a number of scripts and classes 926, or a number of saved configuration files 928. Components 922-928 are additions to the standard application install provided by the install creator or by another vendor.

Figure 10:
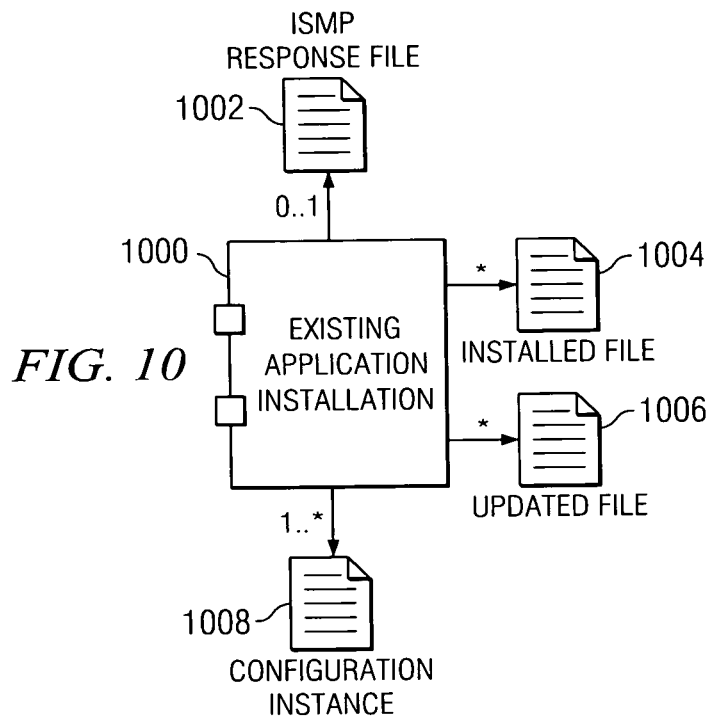
FIG. 10 is a diagram illustrating artifacts that are added to the custom install package in accordance with an aspect of the present invention.

FIG. 10 is a diagram illustrating artifacts that are added to the custom install package in accordance with an aspect of the present invention. In step 756 of FIG. 7B, the profile created may be augmented by adding artifacts from an existing installation to the custom install package. As shown in FIG. 10, entities associated with existing installation 1000 may be added to the new custom install package. These artifacts include response file 1002, a number of installed files 1004, a number of update files 1006, and a number of configuration files 1008.

Response file 1002 is created during the install. Response file 1002 captures user inputs and features that are selected for use in the custom install. Installed files 1004 and updated files 1006 are files, such as jar files, that comprise runtime and administrative binaries in the product install directory. These files may be a mixture of files created during a full install or maintenance install.

Configuration instances 1008 include a complete set of configuration information that can be saved and added to the custom install package. Configuration instances 1008 may be restored when the custom install is executed and may contain applications that have been deployed.

Figure 11:
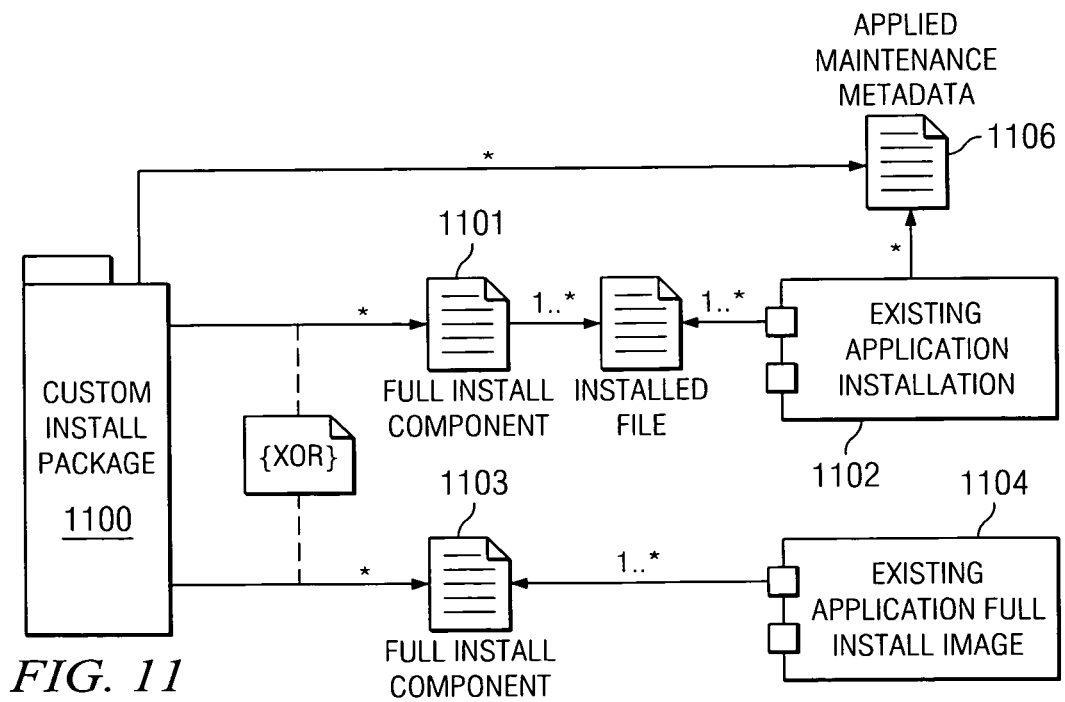
FIG. 11 is a diagram illustrating components for a full install in accordance with an aspect of the present invention.

FIG. 11 is a diagram illustrating components for a full install in accordance with an embodiment of the present invention. As shown in FIG. 11, full install components 1101 and 1103 are components that are to be included in custom install package 1100. Full install components may be obtained from existing full install image 1104 or reverse engineered from files that already exist in the product directory for existing installation 1102. When full install components 1101 are built from existing installation 1102 and maintenance has been applied to that installation, metadata 1106 regarding the installed maintenance may also be added to custom install package 1100.

Figure 12:
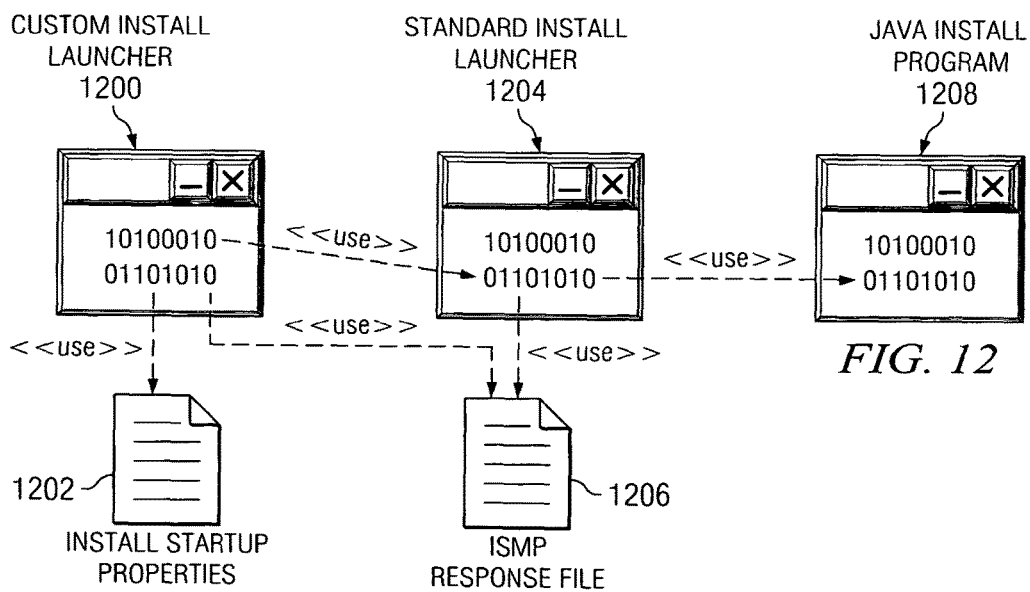
FIG. 12 is a diagram illustrating a custom install package for a custom install in accordance with an aspect of the present invention.

FIG. 12 is a diagram illustrating a custom install package for a custom install in accordance with an embodiment of the present invention. As shown in FIG. 12, custom install package 1200 is a native program or script used to launch the custom installation.

Custom install package reads install setup properties 1202, described further below, to determine the arguments to pass to standard install launcher 1204. Any arguments passed to this program are passed through to the standard install launcher. An ISMP response file may be passed to the standard install launcher if one exists in the custom install package. The standard install launcher is renamed so that this program can use the original name and thereby act as a stand-in for the standard install launcher.

Install setup properties 1202 are created by the install factory and indicates whether the custom install is to be performed silently by default. In addition, custom install package 1200 also passes response file 1206, which contains default values for the user inputs, to standard install launcher 1204 for both silent and interactive installs.

Standard install launcher 1204 is a native install launcher that is used to launch a JAVA install program 1208. The standard install launcher is normally the program used to launch the application installation, but for a custom install it has been renamed and called silently by the custom install package.

JAVA install program 1208 is the application install program, built by ISMP. JAVA install program 1208 may be enhanced to support custom installs.

Figure 13:
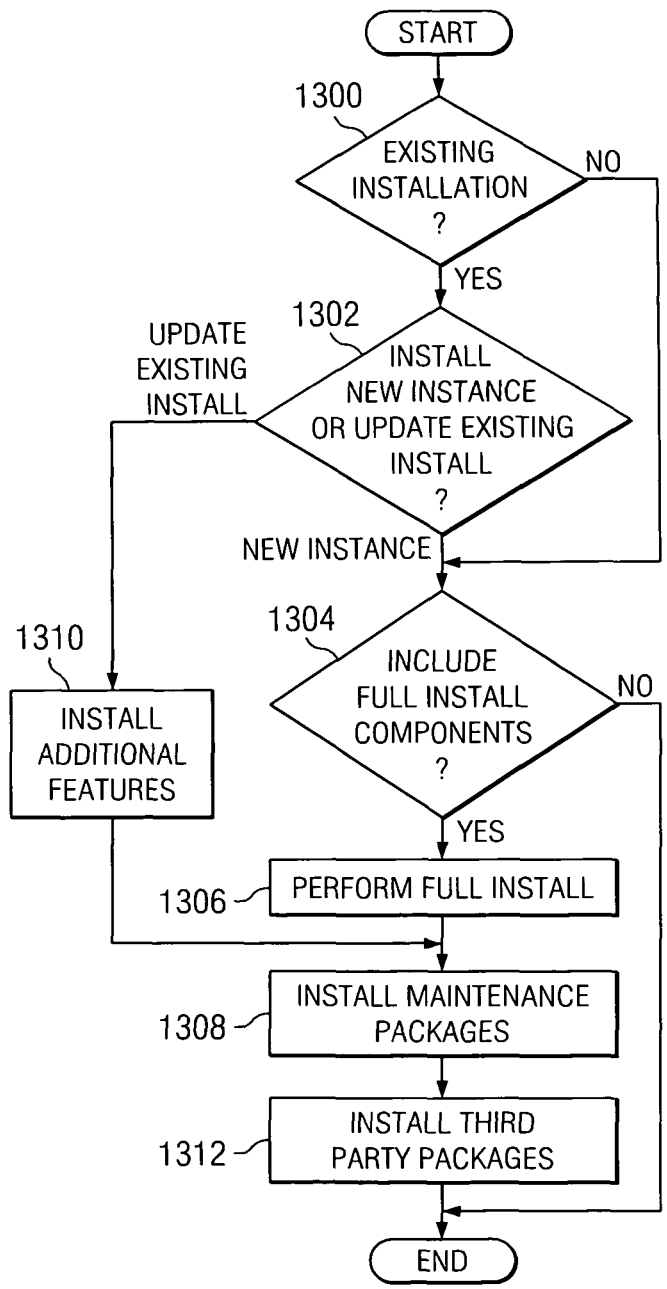
FIG. 13 is a flowchart of a process for a custom install performed by a custom install package, in accordance with an aspect of the present invention.

FIG. 13 is a flowchart of a process for a custom install performed by a custom install package, in accordance with an embodiment of the present invention. The custom install package in this illustrative example may be custom install package 508 in FIG. 5. As shown in FIG. 13, the process begins when the custom install package determines if an existing installation is present in the user's data processing system (step 1300).

If no existing installation is present, the process continues to step 1304. If existing installation is present, the custom install package prompts for whether a new instance is being installed or whether an update is being installed (step 1302). The user may provide this input. If a new instance is being installed, the process continues to step 1304.

A determination is made if the custom install package includes all the full install components (step 1304). If all full install components are not included, the process terminates thereafter. If all full install components are included, the custom install package performs a full install (step 1306) and the process continues to step 1308. If an existing installation is to be updated, the custom install package installs additional features as required (step 1310).

Next, the custom install package installs maintenance packages (step 1308). The maintenance packs in these examples include service packs, interim fixes, and fix packs. Third party packages are then installed (step 1312) and the process terminates thereafter.

The present invention provides a method, apparatus, and computer program product for embodiments of the present invention of the install factory that may be used to create turnkey install packages that install complex applications onto multiple data processing systems in a reliable and reproducible manner. The install factory as embodied in the present invention takes a variety of inputs to build an automated custom installation package. The custom installation package may be used to repeatedly install the same version or configuration of complex software onto multiple data processing systems. Thus, the same install package may perform a full install on a data processing system not having the application, install an updated install on a second data processing system having an older version of the application, and install a fix or service pack on a third data processing system having a second older version of the application. After the install factory install package has completed all installation processes, the data processing systems will have the desired level and configuration of the application software installed.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for creating customizable install packages, the method comprising:
creating a custom full service refresh comprising a full install of an application image at any level of maintenance or service of a computer program onto a target computing node by:
selecting different features of the computer program to be included in the full install and also one or more existing application parameters for the computer program including a version, maintenance level and configuration of the computer program associated with the target computing node;
storing binaries corresponding to the different features of the computer program and the one or more existing application parameters in a directory;
adding to the directory other binaries including one or more maintenance packages for providing maintenance functions for the computer program reflective of at least one maintenance level update to the computer program;
merging the stored binaries and added other binaries in the directory into a single install package to create the custom full service refresh based on a single build plan specifying how the custom full service fresh is built while omitting duplicates of the binaries and applying the maintenance packages to the full install on the fly during the merge; and
deploying the single install package onto the target computing node, whereby the deployment eliminating a requirement to first install the application image of the computer program and then a follow-on maintenance upgrade and instead permitting a single installation operation by an end user of the target computing node.

2. A non-transitory hardware computer readable medium having computer readable instructions embodied therein for directing a data processing system to create customizable install packages, the computer readable instructions, when executed on the data processing system, cause the data processing system to execute operations comprising:
creating a custom full service refresh comprising a full install of an application image at any level of maintenance or service of a computer program onto a target computing node by:
selecting different features of the computer program to be included in the full install and also one or more existing application parameters for the computer program including a version, maintenance level and configuration of the computer program associated with the target computing node;
storing binaries corresponding to the different features of the computer program and the one or more existing application parameters in a directory;
adding to the directory other binaries including one or more maintenance packages for maintenance of the computer program reflective of at least one maintenance level update to the computer program;
merging the stored binaries and added other binaries in the director into a single install package to create the custom full service refresh based on a single build plan specifying how the custom full service fresh is built while omitting duplicates of the binaries and applying the maintenance packages to the full install on the fly during the merge; and
deploying the single install package onto the target computing node, whereby the deployment eliminating a requirement to first install the application image of the computer program and then a follow-on maintenance upgrade and instead permitting a single installation operation by an end user of the target computing node.

* * * * *